Jan. 7, 1964     G. CHIEGER ETAL     3,116,950
AUXILIARY FLOOR FOR LIVESTOCK TRAILERS
Filed March 7, 1962
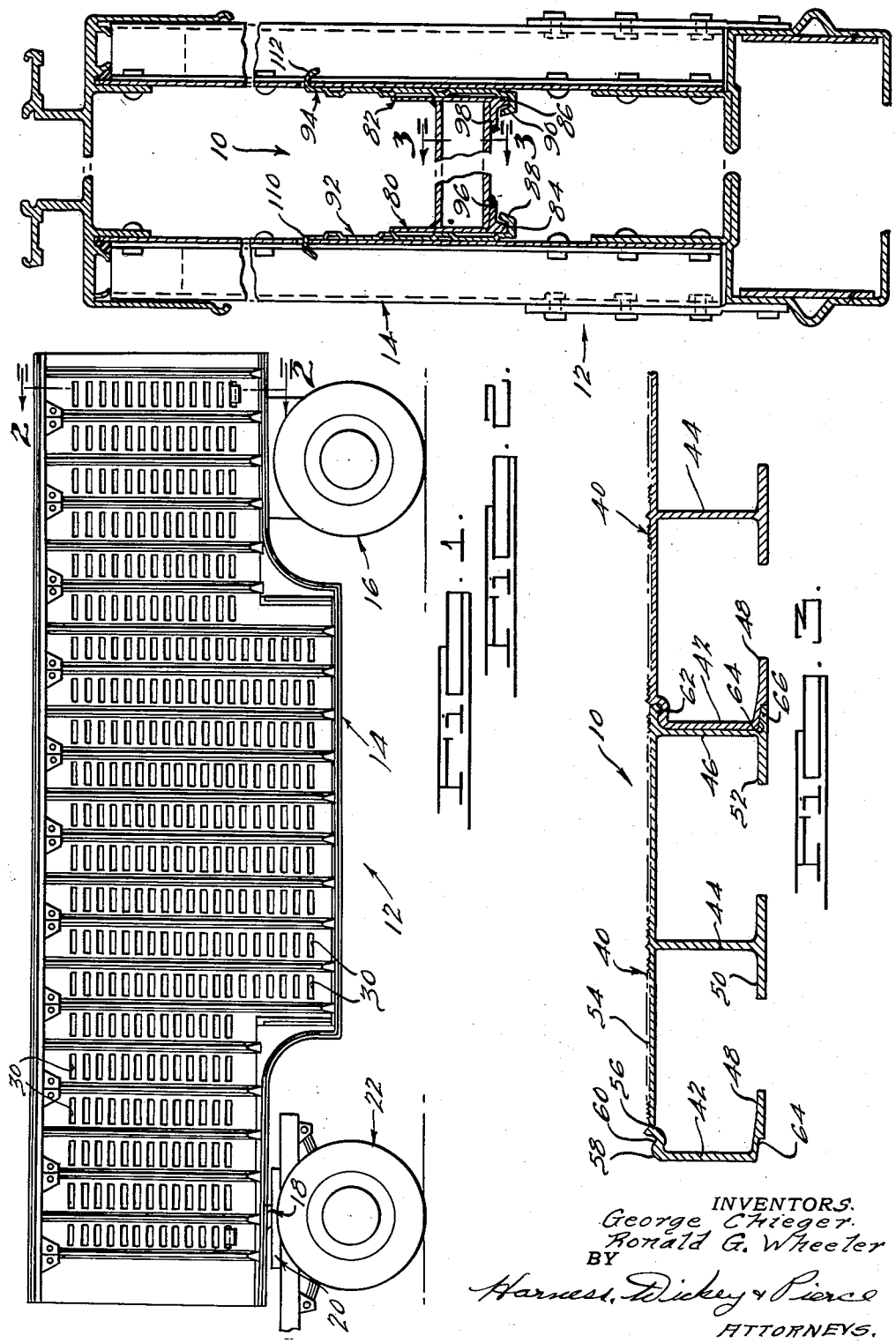
INVENTORS.
George Chieger.
Ronald G. Wheeler
BY
Harness, Dickey & Pierce
ATTORNEYS.

United States Patent Office 3,116,950
Patented Jan. 7, 1964

3,116,950
AUXILIARY FLOOR FOR LIVESTOCK TRAILERS
George Chieger, Grosse Pointe Woods, and Ronald G.
Wheeler, St. Clair Shores, Mich., assignors to Fruehauf
Corporation, a corporation of Michigan
Filed Mar. 7, 1962, Ser. No. 178,199
1 Claim. (Cl. 296—24)

This invention relates generally to wheeled vehicles and more particularly to an improved auxiliary floor for a livestock trailer.

Livestock trailers of the type disclosed in Warren Patent No. 2,934,371 are required to be relatively easily adaptable to various load-carrying requirements. For example, when the trailer is adapted to carry hogs as opposed to cattle, auxiliary floor sections can be relatively closely spaced vertically with respect to one another, whereas when the trailer is conditioned to carry cattle, the floor sections must be removed. Reorientation of the auxiliary floor in livestock trailers heretofore known and used has been a relatively complicated and time-consuming chore, since the floor sections were relatively heavy and difficult to handle.

An auxiliary floor in accordance with the instant invention is relatively easy to assemble and disassemble within a livestock trailer because the floor sections are relatively light and easily handled by one man. Assembly is facilitated by utilizing the trailer side walls for the support of longitudinally extending hangers having a plurality of hooks thereon. Longitudinally extending rail portions of a plurality of laterally extending interlocking floor sections are supported by the hangers.

Accordingly, one object of the present invention is an improved auxiliary floor for livestock trailers and the like.

Another object is an auxiliary floor that is relatively easily assembled and disassembled by one man.

Another object is an auxiliary floor that is compatible with existing livestock trailers.

Another object is an auxiliary floor that is suspended solely from the walls of the trailer.

Other objects and advantages of the present invention will be apparent from the following specification, claim and drawings, wherein:

FIGURE 1 is a side elevational view of a livestock trailer;

FIG. 2 is a cross-sectional view taken substantially along the line 2—2 of FIGURE 1; and FIG. 3 is a cross-sectional view taken substantially along the line 3—3 of FIG. 2.

An auxiliary floor 10, in accordance with an exemplary constructed embodiment of the present invention, is shown in operative association with a livestock trailer 12. The trailer 12 comprises a van-type body 14 that is supported by a wheel suspension 16 at one end thereof and by a kingpin 18 at the other end thereof. The kingpin 18 is accepted in a complementary fifth wheel 20 of a conventional tractor 22. The trailer body 12 is provided with a plurality of vertically and longitudinally spaced apertures 30 that facilitate cleaning of the van body 14 and provide for the passage of air thereinto.

As best seen in FIG. 3, the auxiliary floor 10 comprises a plurality of floor sections 40 constructed of, for example, aluminum extrusions, each having vertically extending rib portions 42, 44, and 46 with horizontally extending foot portions 48, 50, and 52, respectively. The floor surface of the auxiliary floor 10 is defined by a horizontally extending upper plate portion 54 on each section 40.

One end 56 of the plate portion 54 of the floor section 40 is provided with a generally arcuate upwardly facing seat 58 terminating in a downwardly extending arcuate recess 60 for the acceptance of a complementary curved terminal edge portion 62 of an adjacent floor section 40. Similarly, the foot portion 48 of the floor section 40 has a recess 64 therein for the acceptance of a flange portion 66 of the foot 52 on the next adjacent floor section 40. In this manner, adjacent sections 40 of the floor 10 are interlocked to form a substantially continuous relatively rigid assembly.

The floor sections 40 have a pair of longitudinally extending generally L-shaped rail portions 80 and 82 secured at opposite ends thereof, as by welding. The rail portions 80 and 82 have downwardly extending flange portions 84 and 86, respectively, that are removably accepted in reentrantly directed lower hook portions 88 and 90 of a pair of floor support hangers 92 and 94, respectively. The rail portions 80 and 82 of the floor sections 40 have inwardly directed flanges 96 and 98 thereon, respectively, that underlie and support the foot portions 42, 44, and 46 thereof.

The hangers 92 and 94 extend longitudinally of the van 14 and have reentrantly folded upper hook portions 110 and 112 thereon, respectively, for engagement in selected ones of the apertures 30 in the side walls.

It should be apparent that the auxiliary floor 10 is assembled by merely engaging the upper hook portions 110 and 112 of the hangers 92 and 94 in selected apertures 30, whereupon the rails 80 and 82 of the floor sections 40 are engaged in the lower hook portions 88 and 90 of the hangers 92 and 94. The floor sections 40 engage one another in interlocking relationship. In this manner, the auxiliary floor 10 is built up of a number of relatively light, easily handled components. The floor 10 is obviously disassembled in the reverse manner. It is to be noted that a load on the floor panels 40 tends to restrain the van 14 of the trailer 12 from outward bowing or flexure.

It is to be understood that the specific construction of the improved auxiliary floor for livestock trailers herein disclosed and described is presented for the purpose of explanation and illustration and is not intended to indicate limits of the invention, the scope of which is defined by the following claim.

What is claimed is:

An auxiliary floor for a livestock trailer having a pair of longitudinally extending side walls with a plurality of vertically and longitudinally spaced apertures therein, respectively, said floor comprising
 a plurality of hangers
  having oppositely and reentrantly directed longitudinally extending upper and lower end portions,
  respectively, the upper end portions of said hangers being removably and pivotally engageable in selected longitudinally spaced horizontally aligned apertures in the side walls, respectively, and
 a plurality of floor sections
  removably supported by said hangers and extending laterally therebetween, said floor sections having a pair of rails, respectively, having longitudinally downwardly extending edge portions removably and pivotally received in the reentrantly directed longitudinally extending lower end portions of said hangers, respectively, to preclude the transmission of bending stress in said floor sections to said side walls, said floor sections having upper and lower interlocking edge portions, respectively, which form a substantially rigid floor when engaged with one another.

References Cited in the file of this patent

UNITED STATES PATENTS

| | | |
|---|---|---|
| 2,316,554 | Bryan | Apr. 13, 1943 |
| 2,753,018 | Currell | July 3, 1956 |
| 2,839,327 | Simpkins | June 17, 1958 |
| 2,841,437 | Turpin | July 1, 1958 |

FOREIGN PATENTS

| | | |
|---|---|---|
| 1,093,222 | Germany | Nov. 17, 1960 |